(12) United States Patent
Iwamura

(10) Patent No.: US 8,311,269 B2
(45) Date of Patent: Nov. 13, 2012

(54) BLOCKER IMAGE IDENTIFICATION APPARATUS AND METHOD

(75) Inventor: Hiroshi Iwamura, Tsurugashima (JP)

(73) Assignee: Pioneer Corporation, Tokyo (JP)

( * ) Notice: Subject to any disclaimer, the term of this patent is extended or adjusted under 35 U.S.C. 154(b) by 980 days.

(21) Appl. No.: 12/300,070

(22) PCT Filed: Apr. 26, 2007

(86) PCT No.: PCT/JP2007/059029
§ 371 (c)(1),
(2), (4) Date: Dec. 31, 2008

(87) PCT Pub. No.: WO2007/129591
PCT Pub. Date: Nov. 15, 2007

(65) Prior Publication Data
US 2009/0180670 A1    Jul. 16, 2009

(30) Foreign Application Priority Data

May 9, 2006    (JP) ................................. 2006-130184

(51) Int. Cl.
*G06K 9/00* (2006.01)
(52) U.S. Cl. .......................... 382/100; 382/103; 382/107
(58) Field of Classification Search ................. 382/103, 382/107, 190–206, 255, 286, 291, 276
See application file for complete search history.

(56) References Cited

U.S. PATENT DOCUMENTS

| | | | |
|---|---|---|---|
| 5,706,361 A * | 1/1998 | Kent et al. ..................... | 382/103 |
| 6,345,105 B1 | 2/2002 | Nitta et al. | |
| 2001/0040982 A1 * | 11/2001 | Kim et al. ..................... | 382/103 |
| 2004/0120598 A1 * | 6/2004 | Feng ............................. | 382/263 |
| 2006/0078191 A1 * | 4/2006 | Matsumura ................... | 382/149 |

FOREIGN PATENT DOCUMENTS

| | | |
|---|---|---|
| JP | 11-316843 A | 11/1993 |
| JP | 07-065173 A | 3/1995 |
| JP | 09-252467 A | 9/1997 |
| JP | 2002-027449 A | 1/2002 |
| JP | 2004-110542 A | 4/2004 |
| JP | 2005-136727 A | 5/2005 |

OTHER PUBLICATIONS

Supplementary European Search Report for EP 07 74 2464 dated Apr. 12, 2012.
Pearl, P.R., et al., "Frame Grabber Performs Real-Time Object Analysis," Laser Focus World, vol. 33, No. 8, Aug. 1, 1997, pp. S11-S14, S16 (XP000699670, ISSN: 1043-8092).

* cited by examiner

*Primary Examiner* — Jingge Wu
*Assistant Examiner* — Avinash J Yentrapati
(74) *Attorney, Agent, or Firm* — Sughrue Mion, PLLC

(57) ABSTRACT

Frequency analysis is performed on an image signal on a pixel by pixel basis or on a block by block basis, each block including a plurality of pixels, for each frame of the image signal. Then, a motion level or blur level is calculated on a pixel by pixel basis or on a block by block basis in accordance with a result of the frequency analysis. After the calculated motion level or blur level is converted into a binary value, 2-dimensional continuous regions are detected and a large region is extracted from the detected regions. It is then determined whether the large region is a blocker part based on at least one of an area ratio, a shape, and a position of the large region.

18 Claims, 8 Drawing Sheets

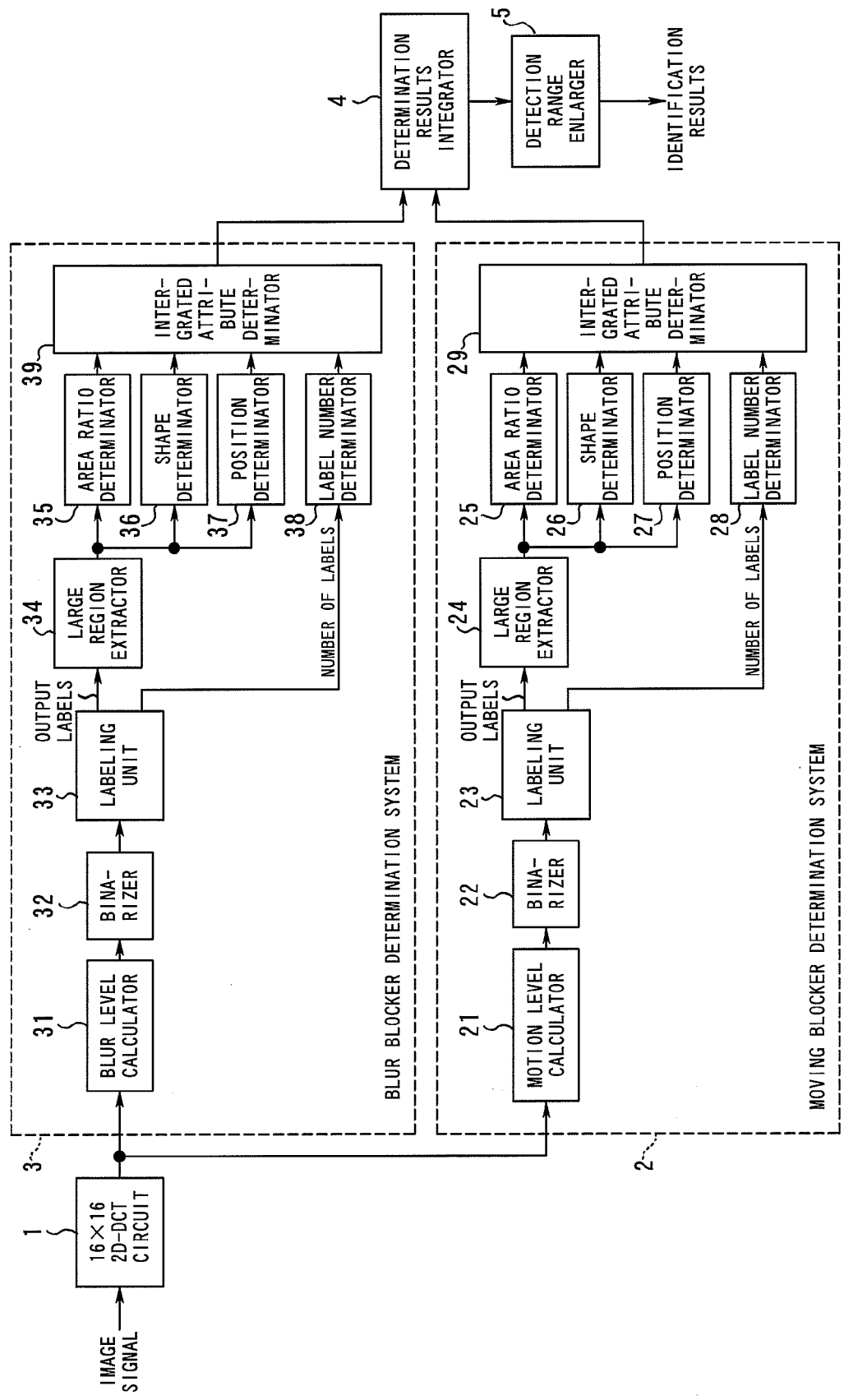

FIG.4A SOURCE IMAGE
FIG.4B BINARIZED MOTION LEVELS
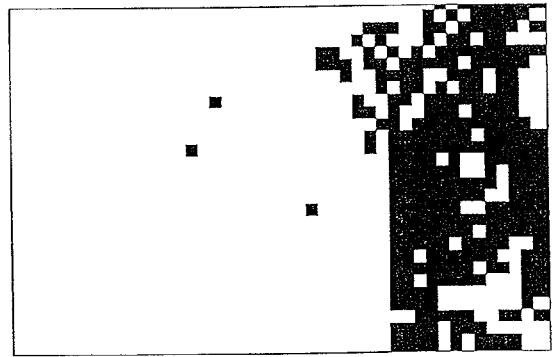
FIG.4C LABELING PROCESS (5 LABELS)
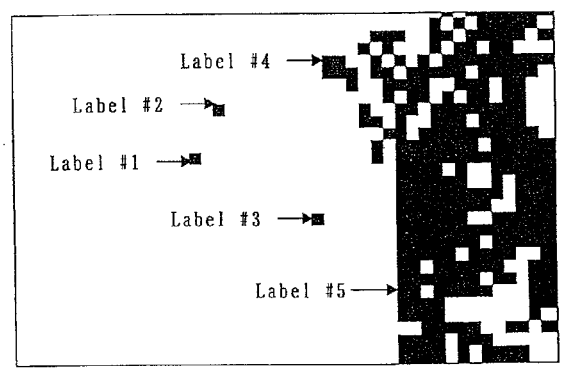
FIG.4D LARGE REGION EXTRACTION
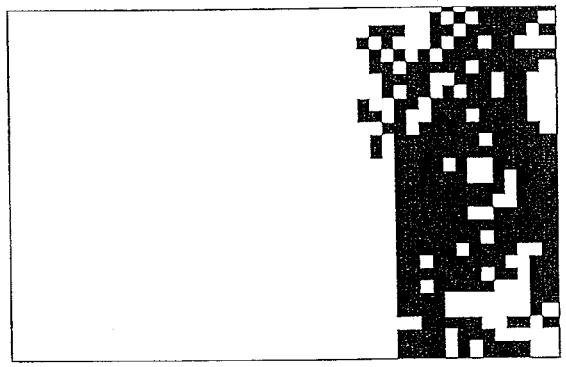
FIG.4E MOVING BLOCKER DETERMINATION
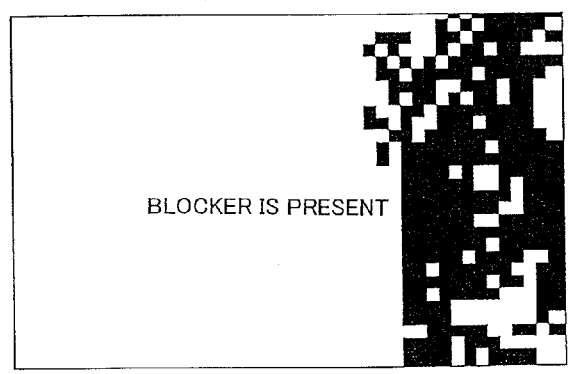

FIG.5A SOURCE IMAGE
FIG.5B BINARIZED MOTION LEVELS
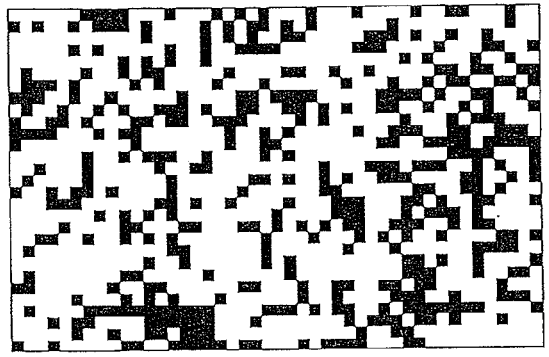
FIG.5C LABELING PROCESS (50 LABELS)
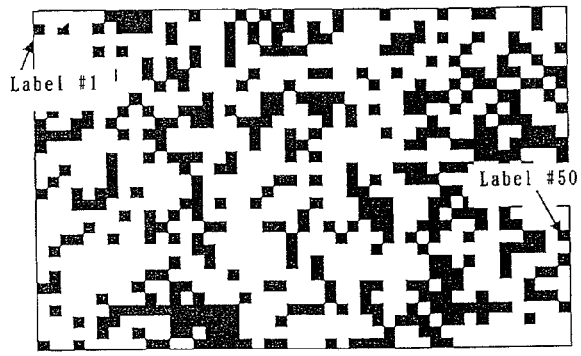
FIG.5D LARGE REGION EXTRACTION
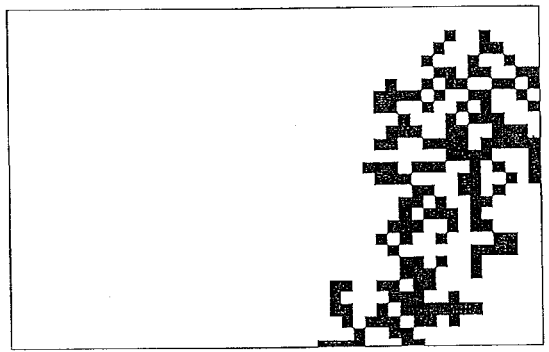
FIG.5E MOVING BLOCKER DETERMINATION
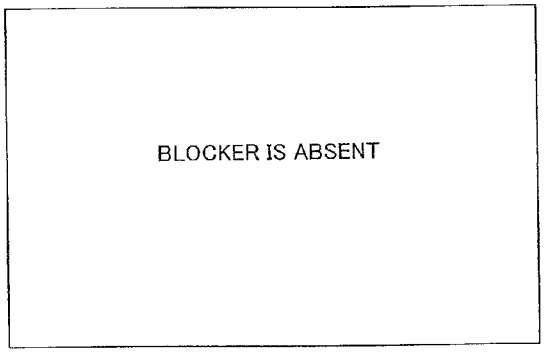
BLOCKER IS ABSENT FIG.6A SOURCE IMAGE
FIG.6B BINARIZED BLUR LEVELS
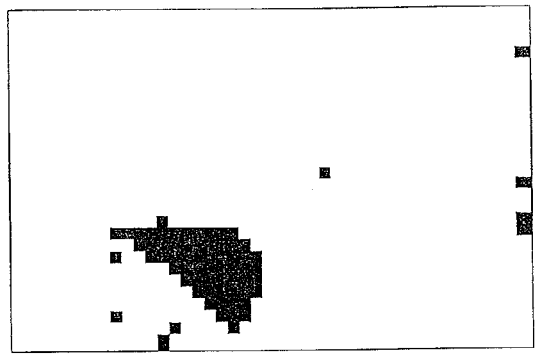
FIG.6C LABELING PROCESS (8 LABELS)
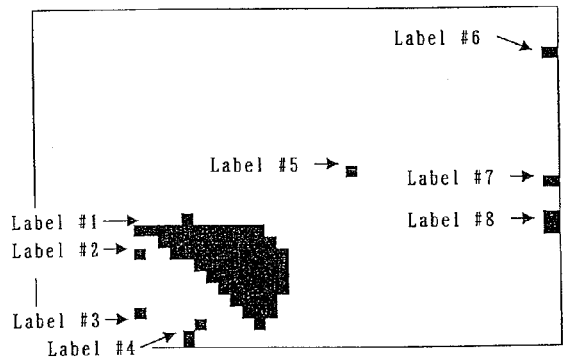
FIG.6D LARGE REGION EXTRACTION
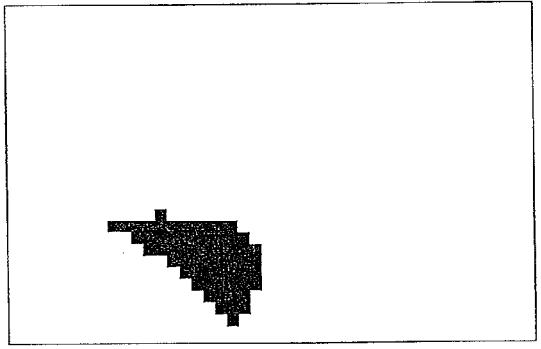
FIG.6E BLOR BLOCKER DETERMINATION
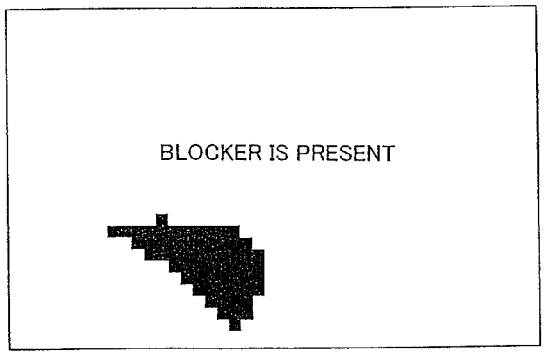

BLOCKER IMAGE IDENTIFICATION APPARATUS AND METHOD

CROSS REFERENCE TO RELATED APPLICATION

This application is a National Stage of International Application No. PCT/JP2007/059029 filed Apr. 26, 2007, claiming priority based on Japanese Patent Application No. 2006-130184, filed May 9, 2006, the contents of all of which are incorporated herein by reference in their entirety.

TECHNICAL FIELD

The present invention relates to a blocker image identification apparatus and method for identifying a blocker in an image.

BACKGROUND ART

A video camera is widely used by general users to enjoy capturing images during a variety of events or travels. However, users generally simply store captured images without modification after viewing it only once or without viewing it. The primary reason is that unmodified captured images are raw materials that are not suitable for viewing with enjoyment. The reason why the captured images without modification are not suitable for viewing with enjoyment is, for example, that images captured by a video camera frequently include bad scenes where a person cuts in front of the video camera during capturing or where someone's head enters a screen of the video camera at the lower side of the screen. To obtain attractive content that is suitable for viewing with enjoyment, it is necessary to perform an editing process. However, since editing requires time and effort, users often give up editing captured images and consequently leave the captured images unmodified.

To perform editing, first, it is necessary to check all captured images to select scenes to be retained and unnecessary scenes to be removed. Thereafter, when needed, the images are modified or processed and captions are finally inserted into the images or transition effects are applied to joints. The insertion of captions that is performed finally and the application of transition effects are enjoyable in many aspects since they are creative processes. However, the initial process of selecting scenes requires a lot of time and is not interesting since it is necessary to view all captured images that are to be edited. Thus, at this initial stage, users often lose interest and give up editing the captured images.

To easily select images of unnecessary scenes from among images that are being edited, it is necessary to identify a blocker (i.e., an object which blocks the front of a subject) in each image. In one conventional method for identifying a moving object as such a blocker, an image memory for storing image signals obtained by capturing images using a camera is installed, the magnitudes of motion vectors of images between image frames are measured to detect a moving region, coordinates of the detected moving region on the camera image are converted into real space coordinates, and at least one of the size, the aspect ratio, or the moving speed of the object at the converted real space coordinates is compared with those of a table, in which features of a plurality of objects are previously registered, to identify the type of the moving object (Japanese Patent Application Publication No. 2002-027449).

In another known method, a motion vector of an object that is in motion in an image is extracted, object blocks are extracted based on motion indices, and statistical values thereof are obtained and are then compared with reference values to determine a target moving object (Japanese Patent Application Publication No. 09-252467).

In a known method for identifying a blurry region in a captured image, the area of a region having a focusing level below a predetermined level is detected according to the contrast ratio and the region is determined to be a blocker region if the detected area is larger than a predetermined area (Japanese Patent Application Publication No. 2005-136727).

However, these conventional methods for identifying a moving object or a blur portion have problems in that it is necessary to use camera information and to extract and track feature points and it is also not possible to identify an object from a general image signal with sufficient accuracy.

DISCLOSURE OF THE INVENTION

These are examples of the problems to be solved by the invention and it is an object of the invention to provide a blocker image identification apparatus and method that can accurately identify a blocker in an image from an image signal and a computer readable program that performs the blocker image identification method.

There is provided a blocker image identification apparatus for identifying a blocker in an image, the apparatus including motion level calculation means for calculating a motion level of an image signal on a pixel by pixel basis or on a block by block basis for each frame of the image signal, binarizing means for converting the calculated motion level into a binary value, 2-dimensional continuous region detection means for detecting a continuous region including adjacent pixels or blocks, the motion levels of which the binarizing means has converted into the same binary value, for each frame, large region extraction means for extracting, as a large region, a region having an area greater than a predetermined area from regions detected by the 2-dimensional continuous region detection means, and determination means for determining that the large region extracted by the large region extraction means is a blocker part based on at least one of an area ratio, a shape, and a position of the large region.

There is provided a blocker image identification apparatus for identifying a blocker in an image, the apparatus including blur level calculation means for calculating a blur level of an image signal on a pixel by pixel basis or on a block by block basis for each frame of the image signal, binarizing means for converting the calculated blur level into a binary value, a 2-dimensional continuous region detection means for detecting a continuous region including adjacent pixels or blocks, the blur levels of which the binarizing means has converted into the same binary value, for each frame, large region extraction means for extracting, as a large region, a region having an area greater than a predetermined area from regions detected by the 2-dimensional continuous region detection means, and determination means for determining that the large region extracted by the large region extraction means is a blocker part based on at least one of an area ratio, a shape, and a position of the large region.

There is provided a blocker image identification apparatus for identifying a blocker in an image, the apparatus including motion level calculation means for calculating a motion level of an image signal on a pixel by pixel basis or on a block by block basis for each frame of the image signal, first binarizing means for converting the calculated motion level into a binary value, first 2-dimensional continuous region detection means for detecting a continuous region including adjacent pixels or blocks, the motion levels of which the first binarizing means has converted into the same binary value, for each frame, first large region extraction means for extracting, as a large region, a region having an area greater than a predetermined area from regions detected by the first 2-dimensional continuous region detection means, first determination means for determining that the large region extracted by the first large region extraction means is a blocker part based on at least one of an area ratio, a shape, and a position of the large region, blur level calculation means for calculating a blur level of the image signal on a pixel by pixel basis or on a block by block basis for each frame of the image signal, second binarizing means for converting the calculated blur level into a binary value, second 2-dimensional continuous region detection means for detecting a continuous region including adjacent pixels or blocks, the blur levels of which the second binarizing means has converted into the same binary value, for each frame, second large region extraction means for extracting, as a large region, a region having an area greater than a predetermined area from regions detected by the second 2-dimensional continuous region detection means, and second determination means for determining that the large region extracted by the second large region extraction means is a blocker part based on at least one of an area ratio, a shape, and a position of the large region.

There is provided a blocker image identification method for identifying a blocker in an image, the method including a motion level calculation step for calculating a motion level of an image signal on a pixel by pixel basis or on a block by block basis for each frame of the image signal, a binarizing step for converting the calculated motion level into a binary value, a 2-dimensional continuous region detection step for detecting a continuous region including adjacent pixels or blocks, the motion levels of which have been converted into the same binary value at the binarizing step, for each frame, a large region extraction step for extracting, as a large region, a region having an area greater than a predetermined area from regions detected at the 2-dimensional continuous region detection step, and a determination step for determining that the large region extracted at the large region extraction step is a blocker part based on at least one of an area ratio, a shape, and a position of the large region.

There is provided a blocker image identification method for identifying a blocker in an image, the method including a blur level calculation step for calculating a blur level of an image signal on a pixel by pixel basis or on a block by block basis for each frame of the image signal, a binarizing step for converting the calculated blur level into a binary value, a 2-dimensional continuous region detection step for detecting a continuous region including adjacent pixels or blocks, the blur levels of which have been converted into the same binary value at the binarizing step, for each frame, a large region extraction step for extracting, as a large region, a region having an area greater than a predetermined area from regions detected at the 2-dimensional continuous region detection step, and a determination step for determining that the large region extracted at the large region extraction step is a blocker part based on at least one of an area ratio, a shape, and a position of the large region.

There is provided a computer readable program for performing a blocker image identification method for identifying a blocker in an image, the method including a motion level calculation step for calculating a motion level of an image signal on a pixel by pixel basis or on a block by block basis for each frame of the image signal, a binarizing step for converting the calculated motion level into a binary value, a 2-dimensional continuous region detection step for detecting a continuous region including adjacent pixels or blocks, the motion levels of which have been converted into the same binary value at the binarizing step, for each frame, a large region extraction step for extracting, as a large region, a region having an area greater than a predetermined area from regions detected at the 2-dimensional continuous region detection step, and a determination step for determining that the large region extracted at the large region extraction step is a blocker part based on at least one of an area ratio, a shape, and a position of the large region.

There is provided a computer readable program for performing a blocker image identification method for identifying a blocker in an image, the method including a blur level calculation step for calculating a blur level of an image signal on a pixel by pixel basis or on a block by block basis for each frame of the image signal, a binarizing step for converting the calculated blur level into a binary value, a 2-dimensional continuous region detection step for detecting a continuous region including adjacent pixels or blocks, the blur levels of which have been converted into the same binary value at the binarizing step, for each frame, a large region extraction step for extracting, as a large region, a region having an area greater than a predetermined area from regions detected at the 2-dimensional continuous region detection step, and a determination step for determining that the large region extracted at the large region extraction step is a blocker part based on at least one of an area ratio, a shape, and a position of the large region.

BRIEF DESCRIPTION OF DRAWINGS

FIG. 1 is a block diagram illustrating an embodiment of the invention.

FIGS. 4A to 4E illustrate states of components of a blocker image identification apparatus when the apparatus performs a determination operation on an image in which a moving blocker is present.

FIGS. 5A to 5E illustrate states of components of the blocker image identification apparatus when the apparatus performs a determination operation on an image obtained when a video camera pans.

FIGS. 6A to 6E illustrate states of components of the blocker image identification apparatus when the apparatus performs a determination operation on an image in which a blur blocker is present.

Figure 2A:
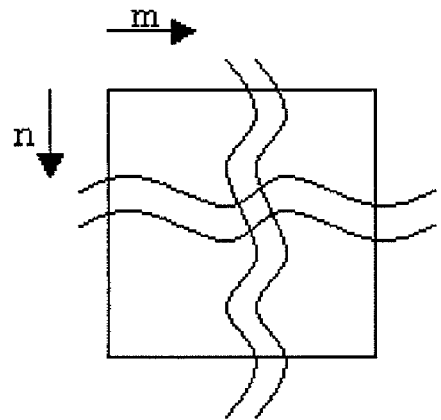
FIGS. 2A and 2B illustrate calculation of motion levels.

1: 2D-DCT circuit
2: moving blocker determination system
3: blur blocker determination system
4: determination results integrator
5: detection range enlarger

BEST MODE FOR CARRYING OUT THE INVENTION

Motion levels of an image signal are calculated on a pixel by pixel basis or on a block by block basis for each frame of the image signal through a motion level calculation means, the calculated motion levels are converted into binary values, 2-dimensional continuous regions are detected through a 2-dimensional continuous region detection means, a large region is extracted from the detected 2-dimensional continuous regions, and, through a determination means, the large region extracted by the large region extraction means is determined to be a blocker part based on at least one of an area ratio, a shape, and a position of the large region. Motion levels of an image signal are calculated on a pixel by pixel basis or on a block by block basis for each frame of the image signal, the calculated motion levels are converted into binary values, 2-dimensional continuous regions are detected, a large region is extracted from the detected 2-dimensional continuous regions, and then the large region extracted by the large region extraction means is determined to be a blocker part based on at least one of an area ratio, a shape, and a position of the large region. The same blocker image identification method is performed through a computer.

It is possible to accurately identify a moving blocker in an image from an image signal.

The motion level calculation means includes a frequency analysis means and calculates a power ratio of a highest frequency component in a vertical direction of a pixel or block as a motion level of the pixel or block according to a result of the frequency analysis. The frequency analysis means performs 2-dimensional Discrete Cosine Transform (DCT) or Discrete Fourier Transform (DFT) on a block by block basis, each block including a plurality of pixels. The 2-dimensional continuous region detection means performs a labeling process on the binary values output from the binarizing means for each frame.

The determination means includes an area ratio determinator for determining that an area ratio determination condition is satisfied when a ratio of an area of a circumscribed rectangle to an area of the large region is within a first predetermined range, a shape determinator for determining that a shape determination condition is satisfied when a ratio of a horizontal width to a vertical width of the large region is within a second predetermined range, and a position determinator for determining that a position determination condition is satisfied when a vertical-direction coordinate of a center of the large region is located at a lower portion of an entire screen of the image signal.

The predetermined condition includes a condition that the number of regions that the 2-dimensional continuous region detection means has detected in one frame be equal to or less than a predetermined number.

Blur levels of an image signal are calculated on a pixel by pixel basis or on a block by block basis for each frame of the image signal through a blur level calculation means, the calculated blur levels are converted into binary values, 2-dimensional continuous regions are detected through a 2-dimensional continuous region detection means, a large region is extracted from the detected 2-dimensional continuous regions, and, through a determination means, the large region extracted by the large region extraction means is determined to be a blocker part based on at least one of an area ratio, a shape, and a position of the large region. Blur levels of an image signal are calculated on a pixel by pixel basis or on a block by block basis for each frame of the image signal, the calculated blur levels are converted into binary values, 2-dimensional continuous regions are detected, a large region is extracted from the detected 2-dimensional continuous regions, and then the large region extracted by the large region extraction means is determined to be a blocker part based on at least one of an area ratio, a shape, and a position of the large region. The same blocker image identification method is performed through a computer.

It is possible to accurately identify an out-of-focus blocker in an image from an image signal.

The blur level calculation means includes a frequency analysis means and calculates a ratio of a low frequency component power to a high frequency component power, from which the low frequency component power of a pixel or block has been subtracted, as a blur level of the pixel or block according to a result of the frequency analysis. The frequency analysis means performs 2-dimensional DCT or DFT on a block by block basis, each block including a plurality of pixels. The 2-dimensional continuous region detection means performs a labeling process on the binary values output from the binarizing means for each frame.

The determination means includes an area ratio determinator for determining that an area ratio determination condition is satisfied when a ratio of an area of a circumscribed rectangle to an area of the large region is within a second predetermined range, a shape determinator for determining that a shape determination condition is satisfied when a ratio of a horizontal width to a vertical width of the large region is within a second predetermined range, and a position determinator for determining that a position determination condition is satisfied when a vertical-direction coordinate of a center of the large region is located at a lower portion of an entire screen of the image signal.

The predetermined condition includes a condition that the number of regions that the 2-dimensional continuous region detection means has detected in one frame be equal to or less than a predetermined number.

Frequency analysis is performed on an image signal on a pixel by pixel basis or on a block by block basis, each including a plurality of pixels, for each frame of the image signal, motion levels of an image corresponding to the image signal are calculated according to a result of the frequency analysis, the calculated motion levels are converted into binary values, 2-dimensional continuous regions are detected, a large region is extracted from the detected 2-dimensional continuous regions, the extracted large region is determined to be a blocker part based on at least one of an area ratio, a shape, and a position of the large region, blur levels of an image corresponding to the image signal are calculated according to a result of the frequency analysis, the calculated blur levels are converted into binary values, 2-dimensional continuous regions are detected, a large region is extracted from the detected 2-dimensional continuous regions, and the extracted large region is determined to be a blocker part based on at least one of an area ratio, a shape, and a position of the large region. Accordingly, it is possible to accurately identify both a moving blocker and an out-of-focus blocker in an image from an image signal.

EMBODIMENTS

The embodiments of the invention will now be described in detail with reference to the accompanying drawings.

FIG. 1 illustrates a blocker image identification apparatus according to the invention. This blocker image identification apparatus includes a 2-Dimensional Discrete Cosine Transform (2D-DCT) circuit 1, a moving blocker determination system 2, a blur blocker determination system 3, a determination results integrator 4, and a detection range enlarger 5.

An input image signal is provided to the 2D-DCT circuit 1. The input image signal represents an image having a resolution of 720x480 pixels. The 2D-DCT circuit 1 DCT-converts a frame of the input image signal into blocks, each including 16×16 pixels. When the input image signal is an interlaced image signal, one frame of the image signal is a combination of two fields. When the input image signal is a progressive image signal, one frame of the image signal is a combination of an odd field of one frame and an even field of a next frame. One frame of the progressive image signal may also be a combination of an even field of one frame and an odd field of a next frame and the two frames combined to constitute one frame of the progressive image signal may not be consecutive but instead may be several frames away. When the time difference between the two frames combined to constitute one frame is large, it is still possible to respond to a slow moving object. However, if the distance of movement during a period corresponding to the large time difference exceeds the size of a block for processing, it is not possible to detect the moving object. Therefore, it is generally desirable that the time difference be several frames. In addition, regardless of whether the input signal is progressive or interlaced, odd and even fields of adjacent frames may be combined to constitute one frame of the input signal. This enables detection, regardless of whether the input signal is progressive or interlaced. Only odd fields may be combined or only even fields may be combined to constitute one frame of the input signal.

The moving blocker determination system 2 and the blur blocker determination system 3 are connected to an output of the 2D-DCT circuit 1. The moving blocker determination system 2 includes a motion level calculator 21, a binarizer 22, a labeling unit 23, a large region extractor 24, an area ratio determinator 25, a shape determinator 26, a position determinator 27, a label number determinator 28, and an integrated attribute determinator 29.

Figure 2B:
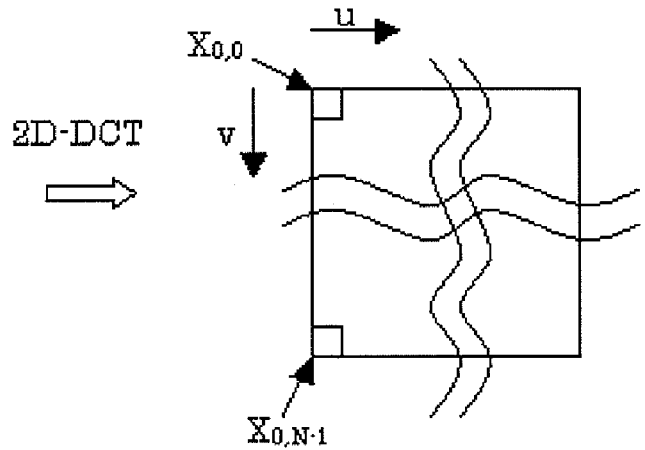

The motion level calculator 21 calculates a motion level representing the magnitude of movement to detect a moving image block according to DCT coefficients of the DCT result. When a block with the number of pixels in a horizontal direction being "m" and with the number of pixels in a vertical direction being "n" as shown in FIG. 2A is DCT-converted, a motion level of the block is calculated using the following equation in a transformed spatial coordinate system with spatial frequencies in a horizontal direction u and spatial frequencies in a vertical direction v as shown in FIG. 2B. The DCT coefficients are $X_{0,0} \sim X_{N-1,N-1}$, where N=16.

$$\frac{X_{0,N-1}^2}{\sum_u \sum_v X_{u,v}^2} \quad \text{[MATHEMATICAL EXPRESSION 1]}$$

The binarizer 22 is connected to an output of the motion level calculator 21 and binarizes the motion level calculated by the motion level calculator 21 using a specific threshold value.

The labeling unit 23 is connected to an output of the binarizer 22 and performs a labeling process on the binarized motion level. In the labeling process, blocks, which have the same binarized motion level value and are adjacent in any of four (upward, downward, left, and right) directions and four diagonal directions, are classified as one region (or group) and the same label is assigned to blocks of the same region. For example, when blocks with a definite binarized motion level value are adjacent to each other, a combination of the blocks is defined as one region (or group) and the same label is assigned to each block in the region. The labeling unit 23 outputs information of the regions to the large region extractor 24 and also outputs the number of labels assigned (i.e., a label number) to the label number determinator 28.

The large region extractor 24 extracts a large region, the area of which is equal to or greater than a predetermined area, from among the regions defined as a result of the labeling process. The predetermined area is equal to, for example, 1/30th of the area of one frame. The large region extractor 24 may also extract a region with the largest area as a large region. The area ratio determinator 25, the shape determinator 26, and the position determinator 27 are connected to an output of the large region extractor 24.

The area ratio determinator 25 detects, for each frame, a ratio of the area of a circumscribed rectangle to the area of a large region, which is equal to or greater than a predetermined area (=circumscribed rectangle area/region area) in the frame and determines that an area ratio determination condition is satisfied when the detected ratio is within a first predetermined range (for example, equal to or greater than 0.5 and less than 1.0). The shape determinator 26 determines whether or not a shape determination condition of the frame is satisfied according to a shape of the large region, the area of which is equal to or greater than the predetermined area, in the frame. The shape determinator 26 determines that the shape determination condition is satisfied when a ratio of a horizontal width to a vertical width of the large region (i.e., horizontal width/vertical) is within a second predetermined range (for example, equal to or greater than 0.7 and equal to or less than 7). The position determinator 27 determines whether or not a position determination condition is satisfied according to the position of the large region in the frame. The position determinator 27 determines that the position determination condition is satisfied when the vertical coordinate of the center of the large region is within a lower 2/3 portion of the entire screen.

The label number determinator 28 determines whether or not the frame is a blocker detection target according to the number of labels assigned by the labeling unit 23. The label number determinator 28 determines that the frame is a blocker detection target when the number of labels is equal to or less than a predetermined number (for example, 10).

The integrated attribute determinator 29 are connected to respective outputs of the area ratio determinator 25, the shape determinator 26, the position determinator 27, and the label number determinator 28. The integrated attribute determinator 29 determines whether or not a blocker is present according to the result of the area ratio determination of the area ratio determinator 25, the result of the shape determination of the shape determinator 26, the result of the position determination of the position determinator 27, and the result of the label number determination of the label number determinator 28. That is, the integrated attribute determinator 29 determines that a blocker is present when it is determined by the label number determinator 28 that the frame is a blocker detection target while the area ratio determination condition, the shape determination condition, and the position determination condition are all satisfied.

The blur blocker determination system 3 includes a blur level calculator 31, a binarizer 32, a labeling unit 33, a large region extractor 34, an area ratio determinator 35, a shape determinator 36, a position determinator 37, a label number determinator 38, and an integrated attribute determinator 39.

The blur level calculator 31 calculates a blur level representing the extent of defocusing in order to detect an out-of-focus block according to DCT coefficients of the DCT result.

Figure 3A:
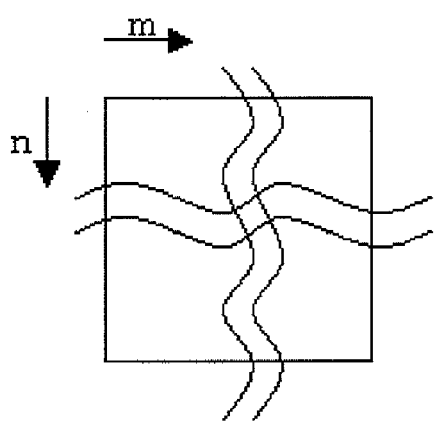
FIGS. 3A and 3B illustrate calculation of blur levels.
Figure 3B:
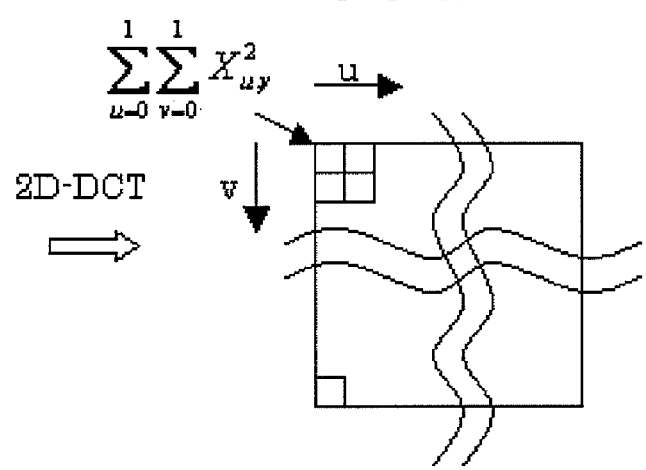
Figure 7:
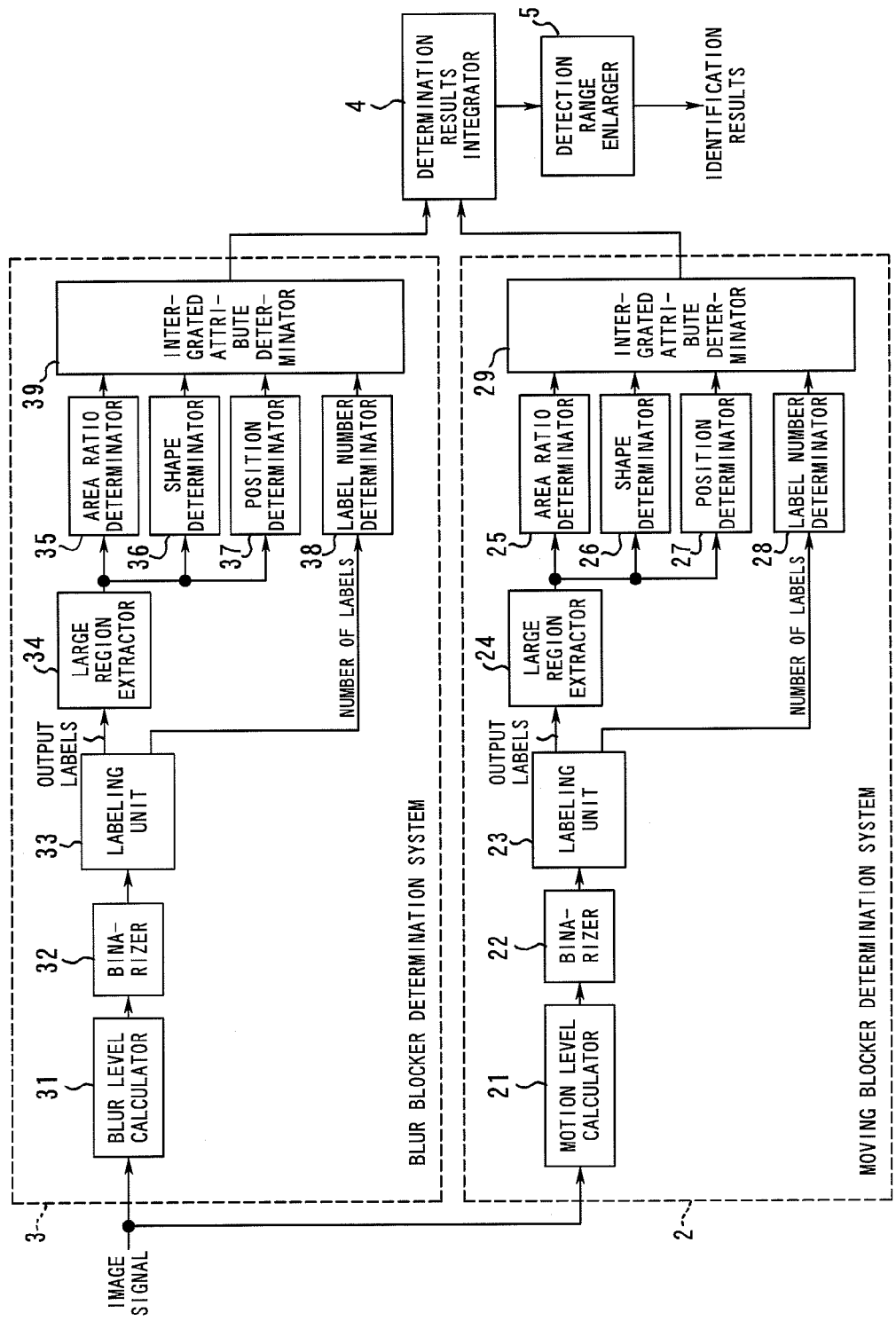
FIG. 7 is a block diagram illustrating another embodiment of the invention.

When a frame with the number of pixels in a horizontal direction being "m" and with the number of pixels in a vertical direction being "n" as shown in FIG. 3A is DCT-converted, a blur level is calculated using an equation expressed in the following Mathematical Expression 3 in a transformed spatial coordinate system with spatial frequencies in a horizontal direction u and spatial frequencies in a vertical direction v as shown in FIG. 3B when a low frequency DCT coefficient power is represented as in the following Mathematical Expression 2.

$$\sum_{u=0}^{1}\sum_{v=0}^{1} X_{u,v}^2 \qquad \text{[MATHEMATICAL EXPRESSION 2]}$$

$$\frac{\sum_{u=0}^{1}\sum_{v=0}^{1} X_{u,v}^2}{\sum_{u=0}^{15}\sum_{v=0}^{15} X_{u,v}^2 - \sum_{u=0}^{1}\sum_{v=0}^{1} X_{u,v}^2} \qquad \text{[MATHEMATICAL EXPRESSION 3]}$$

As can be seen from this equation, the blur level increases as the extent of defocusing of the block increases since the blur level is expressed by a ratio of a low-frequency DCT coefficient power to a high-frequency DCT coefficient power from which the low-frequency DCT coefficient power has been subtracted.

The binarizer 32, the labeling unit 33, the large region extractor 34, the area ratio determinator 35, the shape determinator 36, the position determinator 37, the label number determinator 38, and the integrated attribute determinator 39 are similar to the binarizer 22, the labeling unit 23, the large region extractor 24, the area ratio determinator 25, the shape determinator 26, the position determinator 27, the label number determinator 28, and the integrated attribute determinator 29 of the moving blocker determination system 2.

The binarizer 32 is connected to an output of the blur level calculator 31 and binarizes the blur level calculated by the blur level calculator 31 using a specific threshold value. The labeling unit 33 is connected to an output of the binarizer 32 and performs a labeling process on the binarized blur level. The large region extractor 34 extracts a large region, the area of which is equal to or greater than a predetermined area, from among regions defined as a result of the labeling process. The area ratio determinator 35 determines whether or not an area ratio determination condition is satisfied for each frame. The shape determinator 36 determines whether or not a shape determination condition is satisfied for each frame. The position determinator 37 determines whether or not a position determination condition is satisfied for each frame. The label number determinator 38 determines whether or not each frame is a blocker detection target according to the number of labels assigned by the labeling unit 33.

The integrated attribute determinator 39 determines whether or not a blocker is present according to the determination results of the area ratio determinator 35, the shape determinator 36, the position determinator 37, and the label number determinator 38.

The determination results integrator 4 is connected to the outputs of the integrated attribute determinators 29 and 39. The determination results integrator 4 determines that a blocker is present in a frame when it is determined by at least one of the integrated attribute determinator 29 and 39 that a blocker is present in the frame.

The detection range enlarger 5 determines that a blocker is also present in frames prior to and subsequent to the frame in which it is determined that a blocker is present.

Reference will now be made to how the blocker image identification apparatus operates in the case where a person has entered the frame from the right side, blocking the front of a subject, in a source image of one frame of an input image signal as shown in FIG. 4A. The moving blocker determination system 2 calculates a motion level of each block of the image of the frame. FIG. 4B illustrates motion level values binarized by the binarizer 22. Black parts in FIG. 4B correspond to moving parts. The labeling unit 23 performs a labeling process on the image that has been binarized. In this labeling process, blocks, which are adjacent in any of four (upward, downward, left, and right) directions and four diagonal directions, among black blocks shown in FIG. 4B are defined as one region. FIG. 4C illustrates a result of the labeling process. In this example, the number of labels (Labels #1-#5) is 5. When the labeling unit 23 has detected a plurality of regions, the large region extractor 24 extracts a large region from the plurality of regions. Specifically, based on the result of the labeling process of FIG. 4C, the large region extractor 24 extracts a region corresponding to the person who is in motion at the right side of FIG. 4A as a large region as shown in FIG. 4D. The integrated attribute determinator 29 detects the extracted region as a moving blocker as shown in FIG. 4E when the determination conditions of the area ratio determinator 25, the shape determinator 26, the position determinator 27, and the label number determinator 28 are all satisfied. That is, the integrated attribute determinator 29 determines that the current frame includes a moving blocker. Accordingly, the blocker image identification apparatus can identify an image including a person who has cut in front of a subject.

When a person has cut in front of a camera as in this example, the person is detected as a 2-dimensional continuous region in motion since the person has suddenly entered the frame at a relatively high speed. Of course, the area of the 2-dimensional continuous region is large since the person has cut between the subject and the camera. Accordingly, a person who has cut in front of the camera is detected through the procedure described above. When a person passes behind the subject, the detected moving region is not a large continuous region since the moving region is divided by the subject. The same is true for an object moving at a distance from the camera. To prevent erroneous detection, a condition that a region which is centered at an upper portion of the screen, a region which is very long in a horizontal direction (i.e., which does not appear human), or a region which is centered at the center of the screen (i.e., which is likely to be the subject) not be detected as a moving region can be set for "region attribute determination," thereby accurately detecting a person who has cut in front of the camera. A dominant color or luminance of the region can also be added as a condition for "region attribute determination."

When the camera has moved, a moving region that is present throughout the screen may be detected. Thus, a condition that, when almost the entire screen is detected as a single region or when the number of regions is equal to or greater than a threshold (i.e., when a number of small regions are spread over the entire screen), the region not be detected as a moving region can also be set for "region attribute determination" to enable discrimination of blocker movement from movement caused by camerawork. Here, camerawork may be separately detected and the discrimination of blocker movement from movement caused by camerawork may then be made with reference to the detection of the camerawork.

When a video camera pans to produce a source image in which many moving persons or objects are present as shown in FIG. 5A, motion levels calculated over the entire screen are large and the binarizer 22 binarizes the motion levels as shown in FIG. 5B. FIG. 5C illustrates a result of the labeling process. From FIG. 5C, it can be seen that a large number of regions (i.e., a large number of labels) (Labels #1-#50) have been detected. Even if a large region with the largest area is extracted from the large number of regions as shown in FIG. 5D, the label number determinator 28 does not determine that the large region is a blocker detection target since the number of labels is greater than a predetermined number. Accordingly, an image obtained when a video camera has panned is not determined as a frame including a moving blocker as shown in FIG. 5E.

On the other hand, when an out-of-focus human head is present in a source image of one frame of an input image signal at a lower left portion of the image as shown in FIG. 6A, the blur level calculator 31 calculates a blur level for each block of the frame. FIG. 6B illustrates blur level values binarized by the binarizer 32. Black parts in FIG. 4b correspond to blurry parts. The labeling unit 33 performs a labeling process on the image that has been binarized. In this labeling process, blocks, which are adjacent in any of four (upward, downward, left, and right) directions and four diagonal directions, among black blocks shown in FIG. 6B are defined as one region. FIG. 6C illustrates a result of the labeling process. In this example, the number of labels (Labels #1-#8) is 8. The large region extractor 34 extracts a large region from a plurality of corresponding regions as shown in FIG. 6D. The integrated attribute determinator 39 detects the extracted region as a blur blocker as shown in FIG. 6E when the determination conditions of the area ratio determinator 35, the shape determinator 36, the position determinator 37, and the label number determinator 38 are all satisfied. That is, the integrated attribute determinator 39 determines that the current frame includes a blur blocker. Accordingly, the blocker image identification apparatus can identify an image including someone's head which blocks the front of a subject.

When someone's head has entered the screen at a lower portion thereof as in this example, the head is detected through the above procedure since it is a relatively large 2-dimensional continuous region that is out of focus. When blur level detection is performed based on frequency analysis, a flat portion (for example, the sky) may be erroneously detected as a blurry region. Thus, a condition that a region which is centered at an upper portion of the screen or a region which is very long in a horizontal direction (i.e., which does not appear human) not be detected as a blurry region can be set for "region attribute determination" to accurately detect a head that has entered the screen. A dominant color or luminance of the region can also be added as a condition for "region attribute determination."

When the camera has moved, the entire screen may be blurred. Thus, a condition that, when almost the entire screen is detected as a single region or when the number of regions is equal to or greater than a threshold (i.e., when a number of small regions are spread over the entire screen), the region not be detected as a moving region can also be set for "region attribute determination" to enable discrimination of blurring of the blocker from blurring caused by camerawork. Here, camerawork may be separately detected and the discrimination of blurring of the blocker from blurring caused by camerawork may then be made with reference to the detection of the camerawork.

When it is determined that a blocker is present in the frame in this manner, the detection range enlarger 5 determines that a blocker is present in the frame and frames prior to and subsequent to the frame.

Although the 2D-DCT circuit 1 performs frequency analysis on an image signal and calculates motion levels and blur levels using a result of the frequency analysis in the above embodiment, the image signal may be directly provided to the motion level calculator 21 and the blur level calculator 31 and the motion level calculator 21 and the blur level calculator 31 may then calculate motion levels and blur levels according to the image signal using different methods. That is, the method for calculating motion levels by the motion level calculator 21 and the method for calculating blur levels by the blur level calculator 31 are not limited to those of the above embodiment.

Figure 8:
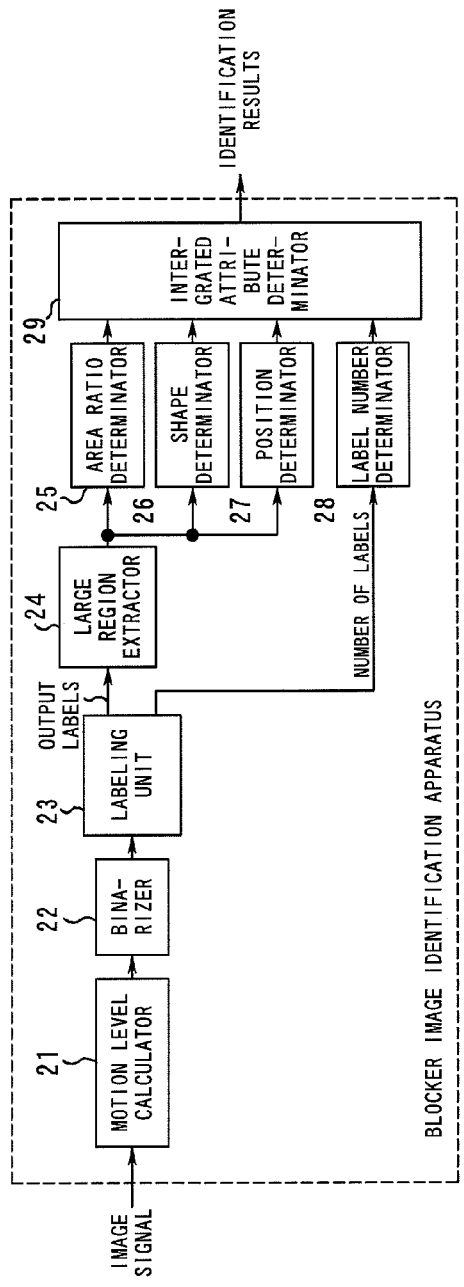
FIG. 8 is a block diagram illustrating a blocker image identification apparatus including only the components of a moving blocker determination system according to an embodiment of the invention.
Figure 9:
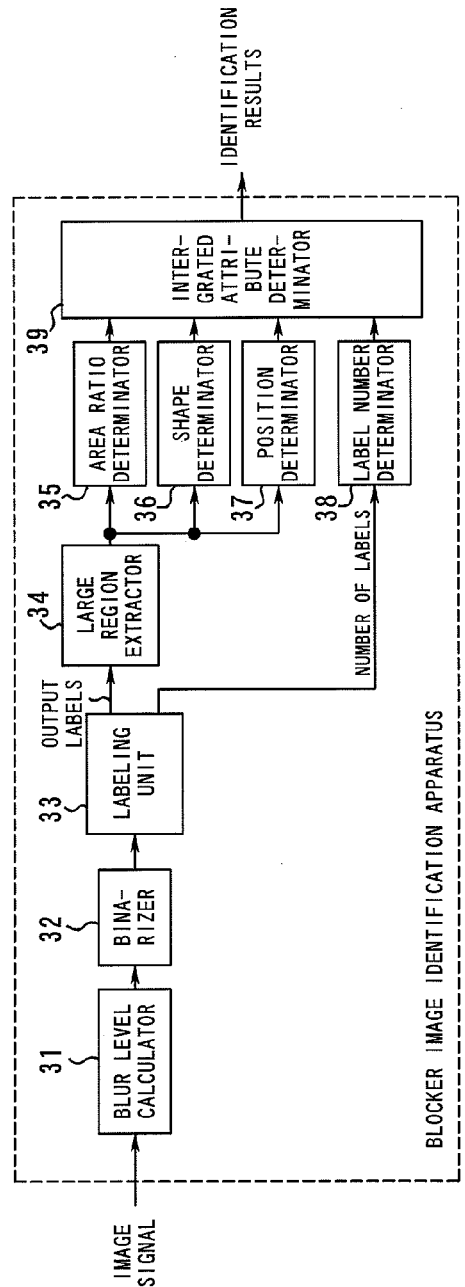
FIG. 9 is a block diagram illustrating a blocker image identification apparatus including only the components of a blur blocker determination system according to an embodiment of the invention.

In addition, although both the moving blocker determination system 2 and the blur blocker determination system 3 are provided and the determination results integrator 4 performs a logical sum operation on their determination results in the above embodiment, only one of the moving blocker determination system 2 and the blur blocker determination system 3 may be provided. That is, there may be provided a blocker image identification apparatus including only the moving blocker determination system 2 as shown in FIG. 8 and there may also be provided a blocker image identification apparatus including only the blur blocker determination system 3 as shown in FIG. 9.

Figure 10:
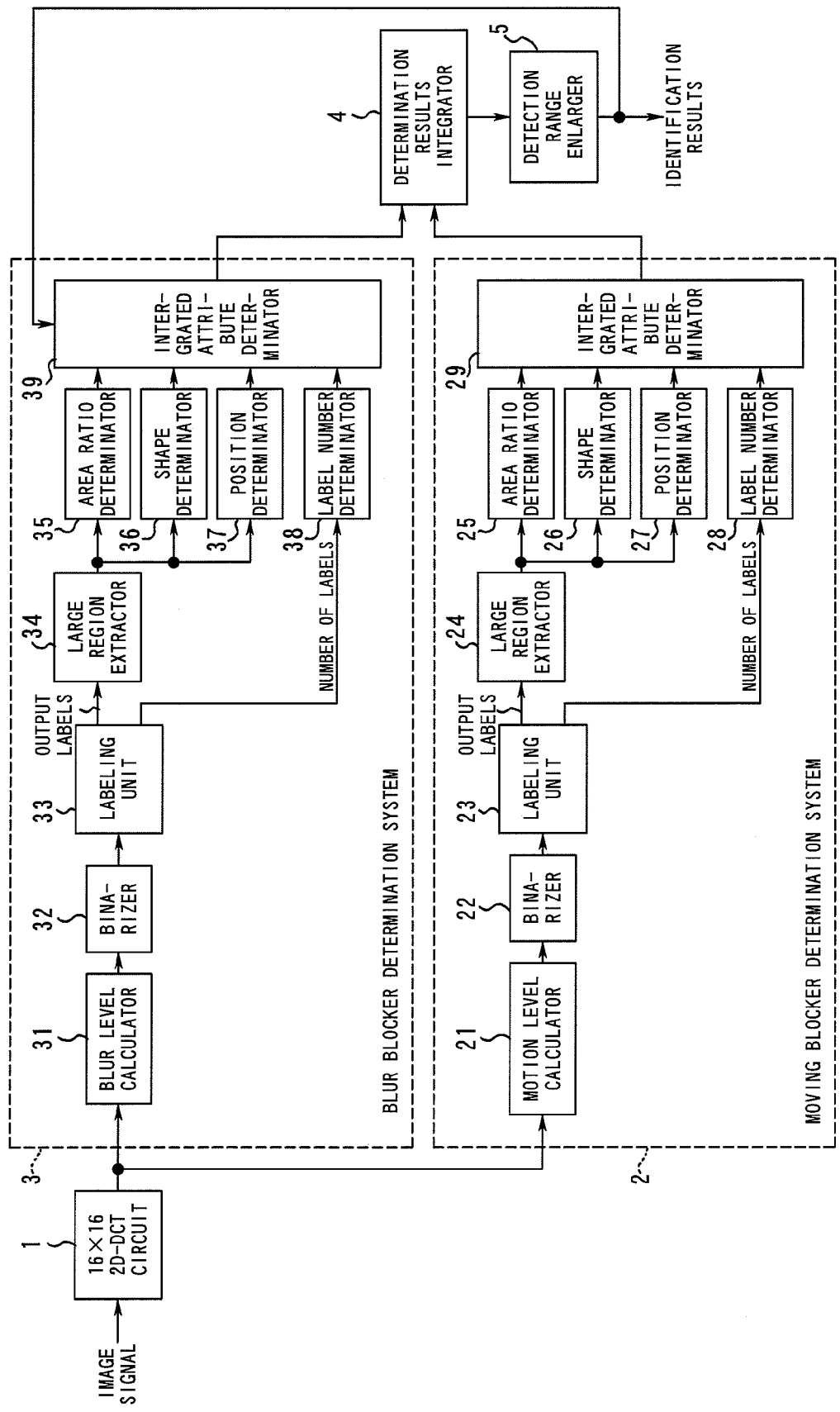
FIG. 10 is a block diagram illustrating another embodiment of the invention.

For example, as shown in FIG. 10, the blur blocker determination system may also be constructed such that an output signal of the detection range enlarger 5 is input to the integrated attribute determinator 39 so as to continue blur blocker determination only for blocks adjacent to a blocker detected by the moving blocker determination system or only when a blur blocker is detected within a predetermined time after a blocker is detected by the moving blocker determination system. This makes it possible to accurately identify a blocker that has cut in front of a subject and remains at that place and to prevent other types of blurry regions from being erroneously identified as blockers.

Although it is not determined that a large region is a blocker if not all the determination conditions of the area ratio determinator 25 (35), the shape determinator 26 (36), and the position determinator 27 (37) are satisfied in the above embodiment, it may be determined that a large region is a blocker if at least one of the determination conditions is satisfied. The determination of the number of labels may be omitted.

Further, although the 2D-DCT circuit 1 performs DCT on an image signal in the above embodiment. Discrete Fourier Transform (DFT) rather than DCT may be used as the conversion method.

Furthermore, although an image signal is processed on a block by block basis for each frame for determining the presence of a blocker in the above embodiment, the image signal may also be processed on a pixel by pixel basis for each frame. In addition, each block is not necessarily 16 pixels×16 pixels and may be other numbers of pixels such as 8 pixels×8 pixels.

The motion level calculation method and the blur level calculation method are not limited to those of the above embodiment. For example, motion levels may be calculated from motion vectors based on block matching used in MPEG coding and may also be calculated from optical flow. Blur levels may be calculated from the contrast of each block.

The moving blocker determination system 2 and the blur blocker determination system 3 may be constructed as individual computers or a single computer. That is, the functions of the components of the moving blocker determination system 2 and the blur blocker determination system 3 may be implemented by storing a computer readable program that performs the operations of the components of the moving blocker determination system 2 and a computer readable program that performs the operations of the components of the blur blocker determination system 3 in a memory in a computer and then executing the program on the computer.

As is apparent from the above description, it is possible to simultaneously identify a moving blocker and an out-of-focus blocker included in an image from an image signal and also to easily select an image of an unnecessary scene from an image when the image is edited.

What is claimed is:

1. A blocker image identification apparatus for identifying a blocker in an image, the apparatus comprising:
    a motion level calculator which calculates a motion level on a pixel by pixel basis or on a block by block basis for each frame of the image signal;
    a binarizer which converts the calculated motion level into a binary value;
    a 2-dimensional continuous region detector which detects a continuous region including adjacent pixels or blocks having a same binary value as an output value of the binarizer, for each frame;
    a large region extractor which extracts, as a large region, a region having an area greater than a predetermined area, of regions detected by the 2-dimensional continuous region detector;
    an area ratio determinator which determines that an area ratio determination condition is satisfied when a ratio of an area of a circumscribed rectangle to an area of the large region is within a first predetermined range;
    a shape determinator which determines that a shape determination condition is satisfied when a ratio of a horizontal width to a vertical width of the large region is within a second predetermined range;
    a position determinator which determines that a position determination condition is satisfied when a vertical-direction coordinate of a center of the large region is located at a lower portion of an entire screen of the image signal; and
    a blocker determinator which determines that the large region extracted by the large region extractor is a blocker part when all of the area ratio determination condition, the shape determination condition, and the position determination condition are satisfied,
    wherein the motion level calculator includes a frequency analyzer which performs frequency analysis on the image signal on a pixel by pixel basis or on a block by block basis, each block including a plurality of pixels, for each frame of the image signal, and calculates a power ratio of a highest frequency component in a vertical direction to all frequency components except direct current components in accordance with a result of the frequency analysis performed by the frequency analyzer.

2. The blocker image identification apparatus according to claim 1, wherein the frequency analyzer performs 2-dimensional Discrete Cosine Transform (DCT) or Discrete Fourier Transform (DFT) on a block by block basis, each block including a plurality of pixels.

3. The blocker image identification apparatus according to claim 1, wherein the 2-dimensional continuous region detector performs a labeling process on the binary values output from the binarizer for each frame.

4. The blocker image identification apparatus according to claim 1, further comprising a number determinator which detects whether or not the number of regions in one frame detected by the 2-dimensional continuous region is equal to or less than a predetermined number, wherein the blocker determinator determines that the large region extracted is a blocker part when the number determinator determines that the number of the regions in one frame is equal to or less than the predetermined number.

5. The blocker image identification apparatus according to claim 1, further comprising a detection range enlarging portion which determines that a blocker part is present in a range of frames including a frame in which the blocker determinator has determined that the large region is a blocker part and a predetermined range of frames prior to and subsequent to the frame.

6. A blocker image identification apparatus for identifying a blocker in an image, the apparatus comprising:
    a frequency analyzer which performs frequency analysis on an image signal on a pixel by pixel basis or on a block by block basis, each block including a plurality of pixels, for each frame of the image signal;
    a blur level calculator which calculates as a blur level of the image a ratio of a low frequency component power to a high frequency component power other than the low frequency component power on a pixel by pixel basis or on a block by block basis for each frame of the image signal in accordance with a result of the frequency analysis performed by the frequency analyzer;
    a binarizer which converts the calculated blur level into a binary value;
    a 2-dimensional continuous region detector which detects a continuous region including adjacent pixels or blocks having a same binary value as an output value of the binarizer, for each frame;
    a large region extractor which extracts, as a large region, a region having an area greater than a predetermined area, of regions detected by the 2-dimensional continuous region detector;
    an area ratio determinator which determines that an area ratio determination condition is satisfied when a ratio of an area of a circumscribed rectangle to an area of the large region is within a first predetermined range;
    a shape determinator which determines that a shape determination condition is satisfied when a ratio of a horizontal width to a vertical width of the large region is within a second predetermined range;
    a position determinator which determines that a position determination condition is satisfied when a vertical-direction coordinate of a center of the large region is located at a lower portion of an entire screen of the image signal; and
    a blocker determinator which determines that the large region extracted by the large region extractor is a blocker part when all of the area ratio determination condition, the shape determination condition, and the position determination condition are satisfied.

7. The blocker image identification apparatus according to claim 6, wherein the frequency analyzer performs 2-dimensional DCT or DFT on a block by block basis, each block including a plurality of pixels.

8. The blocker image identification apparatus according to claim 6, wherein the 2-dimensional continuous region detector performs a labeling process on the binary values output from the binarizer for each frame.

9. The blocker image identification apparatus according to claim 6, further comprises a number determinator detects whether or not the number of regions in one frame detected by the 2-dimensional continuous region is equal to or less than a predetermined number, wherein the blocker determinator determines that the large region extracted is a blocker part when the number determinator determines that the number of the regions in one frame is equal to or less than the predetermined number.

10. The blocker image identification apparatus according to claim 6, further comprising a detection range enlarging portion which determines that a blocker part is present in a range of frames including a frame in which the blocker determinator has determined that the large region is a blocker part and a predetermined range of frames prior to and subsequent to the frame.

11. A blocker image identification apparatus for identifying a blocker in an image, the apparatus comprising:

a motion level calculator which calculates a motion level of an image signal on a pixel by pixel basis or on a block by block basis for each frame of the image signal;

a first binarizer which converts the calculated motion level into a binary value;

a first 2-dimensional continuous region detector which detects a continuous region including adjacent pixels or blocks having a same binary value as an output value of the first binarizer, for each frame;

a first large region extractor which extracts, as a first large region, a region having an area greater than a predetermined area, of regions detected by the first 2-dimensional continuous region detector;

a first area ratio determinator which determines that a first area ratio determination condition is satisfied when a ratio of an area of a circumscribed rectangle to an area of the first large region is within a first predetermined range;

a first shape determinator which determines that a first shape determination condition is satisfied when a ratio of a horizontal width to a vertical width of the first large region is within a second predetermined range;

a first position determinator which determines that a first position determination condition is satisfied when a vertical-direction coordinate of a center of the first large region is located at a lower portion of an entire screen of the image signal;

a first blocker determinator which determines that the large region extracted by the large region extractor is a blocker part when all of the first area ratio determination condition, the first shape determination condition, and the first position determination condition are satisfied;

a blur level calculator which calculates a blur level of an image signal on a pixel by pixel basis or on a block by block basis for each frame of the image signal;

a second binarizer which converts the calculated blur level into a binary value;

a second 2-dimensional continuous region detector which detects a continuous region including adjacent pixels or blocks having a same binary value as an output value of the second binarizer, for each frame;

a second large region extractor which extracts, as a second large region, a region having an area greater than a predetermined area, of regions detected by the second 2-dimensional continuous region detector;

a second area ratio determinator which determines that a second area ratio determination condition is satisfied when a ratio of an area of a circumscribed rectangle to an area of the first large region is within a first predetermined range;

a second shape determinator which determines that a second shape determination condition is satisfied when a ratio of a horizontal width to a vertical width of the large region is within a second predetermined range;

a second position determinator which determines that a second position determination condition is satisfied when a vertical-direction coordinate of a center of the large region is located at a lower portion of an entire screen of the image signal;

a second blocker determinator which determines that the large region extracted by the large region extractor is a blocker part when all of the second area ratio determination condition, the second shape determination condition, and the second position determination condition are satisfied; and a determination result integrator which provides a final determination result based on a result of the determination of the first blocker determinator and a result of the determination of the second blocker determinator, wherein the motion level calculator includes a frequency analyzer which performs frequency analysis on the image signal on a pixel by pixel basis or on a block by block basis, each block including a plurality of pixels, for each frame of the image signal, and calculates a power ratio of a highest frequency component in a vertical direction to all frequency components except direct current components in accordance with a result of the frequency analysis performed by the frequency analyzer.

12. The blocker image identification apparatus according to claim 11, wherein the determination result integrator operates a logical sum of the determination result of the first determinator and the determination result of the second determinator.

13. The blocker image identification apparatus according to claim 11, further comprising a detection range enlarging portion which determines that a blocker part is present in a range of frames including a frame in which the determination result integrator has determined that the large region is a blocker part and a predetermined range of frames prior to and subsequent to the frame.

14. The blocker image identification apparatus according to claim 13, wherein the second determinator determines that the large region is a blocker part only in a range of frames enlarged by the detection range enlarging portion.

15. A blocker image identification method for identifying a blocker in an image, the method comprising:

a motion level calculation step of calculating a motion level on a pixel by pixel basis or on a block by block basis for each frame of an image signal;

a binarizing step of converting the calculated motion level into a binary value;

a 2-dimensional continuous region detection step of detecting a continuous region including adjacent pixels or blocks having a same binary value as an output value in the binarizing step, for each frame;

a large region extraction step of extracting, as a large region, a region having an area greater than a predetermined area, of regions detected in the 2-dimensional continuous region detection step;

an area ratio determinating step of determining that an area ratio determination condition is satisfied when a ratio of an area of a circumscribed rectangle to an area of the large region is within a first predetermined range;

a shape determinating step of determining that a shape determination condition is satisfied when a ratio of a horizontal width to a vertical width of the large region is within a second predetermined range;

a position determinating step determining that a position determination condition is satisfied when a vertical-direction coordinate of a center of the large region is located at a lower portion of an entire screen of the image signal; and a blocker determinating step of determining that the large region extracted in the large region extraction step is a blocker part when all of the area ratio determination condition, the shape determination condition, and the position determination condition are satisfied, wherein the motion level calculation step includes a frequency analyzing step of performing frequency analysis on the image signal on a pixel by pixel basis or on a block by block basis, each block including a plurality of pixels, for each frame of the image signal, and calculates a power ratio of a highest frequency component in a vertical direction to all frequency components except direct current components in accordance with a result of the frequency analysis performed in the frequency analyzing step.

16. A blocker image identification method for identifying a blocker in an image, the method comprising:
- a frequency analyzing step of performing frequency analysis on an image signal on a pixel by pixel basis or on a block by block basis, each block including a plurality of pixels, for each frame of the image signal;
- a blur level calculation step of calculating as a blur level of the image a ratio of a low frequency component power to a high frequency component power other than the low frequency component power on a pixel by pixel basis or on a block by block basis in accordance with a result of the frequency analysis performed in the frequency analyzing step;
- a binarizing step of converting the calculated blur level into a binary value;
- a 2-dimensional continuous region detection step of detecting a continuous region including adjacent pixels or blocks having a same binary value as an output value in the binarizing step, for each frame;
- a large region extraction step of extracting, as a large region, a region having an area greater than a predetermined area, of regions detected in the 2-dimensional continuous region detection step;
- an area ratio determinating step of determining that an area ratio determination condition is satisfied when a ratio of an area of a circumscribed rectangle to an area of the large region is within a first predetermined range;
- a shape determinating step of determining that a shape determination condition is satisfied when a ratio of a horizontal width to a vertical width of the large region is within a second predetermined range;
- a position determinating step determining that a position determination condition is satisfied when a vertical-direction coordinate of a center of the large region is located at a lower portion of an entire screen of the image signal; and
- a blocker determinating step of determining that the large region extracted in the large region extracting step is a blocker part when all of the area ratio determination condition, the shape determination condition, and the position determination condition are satisfied.

17. A non-transitory computer readable medium which stores a computer readable program for performing a blocker image identification method for identifying a blocker in an image, the method comprising:
- a motion level calculation step of calculating a motion level on a pixel by pixel basis or on a block by block basis for each frame of an image signal as data;
- a binarizing step of converting the calculated motion level into a binary value;
- a 2-dimensional continuous region detection step of detecting a continuous region including adjacent pixels or blocks having a same binary value as an output value in the binarizing step, for each frame;
- a large region extraction step of extracting, as a large region, a region having an area greater than a predetermined area, of regions detected in the 2-dimensional continuous region detection step;
- an area ratio determinating step of determining that an area ratio determination condition is satisfied when a ratio of an area of a circumscribed rectangle to an area of the large region is within a first predetermined range;
- a shape determinating step of determining that a shape determination condition is satisfied when a ratio of a horizontal width to a vertical width of the large region is within a second predetermined range;
- a position determinating step of determining that a position determination condition is satisfied when a vertical-direction coordinate of a center of the large region is located at a lower portion of an entire screen of the image signal; and
- a blocker determinating step of determining that the large region extracted in the large region extraction step is a blocker part when all of the area ratio determination condition, the shape determination condition, and the position determination condition are satisfied,
- wherein the motion level calculation step includes a frequency analyzing step of performing frequency analysis on the image signal on a pixel by pixel basis or on a block by block basis, each block including a plurality of pixels, for each frame of the image signal, and calculates a power ratio of a highest frequency component in a vertical direction to all frequency components except direct current components in accordance with a result of the frequency analysis performed in the frequency analyzing step.

18. A non-transitory computer readable medium which stores a computer readable program for performing a blocker image identification method for identifying a blocker in an image, the method comprising:
- a frequency analyzing step of performing frequency analysis on an image signal as data on a pixel by pixel basis or on a block by block basis, each block including a plurality of pixels, for each frame of the image signal;
- a blur level calculation step of calculating as a blur level of the image a ratio of a low frequency component power to a high frequency component power other than the low frequency component power on a pixel by pixel basis or on a block by block basis in accordance with a result of the frequency analysis performed in the frequency analyzing step;
- a binarizing step of converting the calculated blur level into a binary value;
- a 2-dimensional continuous region detection step of detecting a continuous region including adjacent pixels or blocks having a same binary value as an output value in the binarizing step, for each frame;
- a large region extraction step of extracting, as a large region, a region having an area greater than a predetermined area, of regions detected in the 2-dimensional continuous region detection step;
- a shape determinating step of determining that a shape determination condition is satisfied when a ratio of a horizontal width to a vertical width of the large region is within a second predetermined range;
- a position determinating step of determining that a position determination condition is satisfied when a vertical-direction coordinate of a center of the large region is located at a lower portion of an entire screen of the image signal; and
- a blocker determinating step of determining that the large region extracted in the large region extraction step is a blocker part when all of the area ratio determination condition, the shape determination condition, and the position determination condition are satisfied.

* * * * *